United States Patent [19]

Aranovich

[11] Patent Number: 4,715,407
[45] Date of Patent: Dec. 29, 1987

[54] SPOOL VALVE ASSEMBLY

[75] Inventor: Felix Aranovich, Skokie, Ill.

[73] Assignee: Clevite Industries Inc., Glenview, Ill.

[21] Appl. No.: 918,237

[22] Filed: Oct. 14, 1986

[51] Int. Cl.$^4$ ............................................. F15B 13/044
[52] U.S. Cl. ............................ 137/625.65; 137/625.69
[58] Field of Search ...................... 137/625.65, 625.69

[56] References Cited

U.S. PATENT DOCUMENTS

| | | | |
|---|---|---|---|
| 4,056,126 | 11/1977 | Hauser et al. | 137/625.65 |
| 4,155,535 | 5/1979 | Seamone | 137/625.69 X |
| 4,611,632 | 9/1986 | Kolchinsky et al. | 137/625.65 |

FOREIGN PATENT DOCUMENTS

| | | | |
|---|---|---|---|
| 1550632 | 1/1970 | Fed. Rep. of Germany | 137/625.65 |
| 2062186 | 5/1981 | United Kingdom | 137/625.65 |

Primary Examiner—Gerald A. Michalsky
Attorney, Agent, or Firm—Russell E. Bauman

[57] ABSTRACT

A fluid flow control valve having a block defining a spool valve chamber and ports communicating with the chamber. A spool valve assembly for selectively controlling flow through the valve includes a spool body having an annular end provided with at least one axially outwardly opening notch. A spool end on the spool body defines a first frustoconical, axially outwardly narrowing outer surface concentrically within the annular end of the spool body, and a second, frustoconical, axially outwardly widening radially outer surface extending axially outwardly from the axial outer end of the first frustoconical surface and axially outwardly of the spool outer end.

16 Claims, 2 Drawing Figures

SPOOL VALVE ASSEMBLY

BACKGROUND OF THE INVENTION

1. Field of the Invention

This invention relates to fluid flow control valves and in particular to spool valve assemblies for use therein.

2. Description of the Background Art

In one form of fluid flow control valve, a spool is selectively positionable in a valve chamber so as to provide selective flow between a pressure port opening to the valve chamber and either of two different cylinder ports.

In such valves, it is desirable to connect the cylinder port acting as a return port to a tank port by conducting fluid flow therefrom around the end of the spool valve assembly to the tank port. Thus, depending on the direction of valve movement, the return fluid is conducted around either end of the selectively positioned spool valve assembly through suitable passages in the control valve block to the tank port.

As the end of the spool is moved to uncover the opening to the cylinder port, an abrupt delivery of the fluid occurs in the present valves. At the same time, the flow of the fluid tends to be generally transversely to the entrance to the tank port passage, causing turbulences within the valve. The resultant instability has long been a vexatious problem in connection with such valves.

SUMMARY OF THE INVENTION

The present invention comprehends an improved fluid flow control valve having a spool valve assembly which eliminates the problems of the prior art valves in a novel and simple manner.

More specifically, the present invention comprehends the provision of such a fluid flow control valve wherein means are provided for gradually increasing the cross-sectional area of the transfer passage between the cylinder port and tank port openings to the valve chamber as a function of the longitudinal movement of the spool valve.

In the illustrated embodiment, the spool valve assembly includes a spool having one or more notches in an annular end portion thereof, which widen outwardly whereby movement of the spool provides a gradually increasing cross section of the outwardly widening notch to the cylinder port, thereby providing an improved, stabilized flow of the fluid around the spool valve assembly.

The invention further comprehends means on the spool valve assembly for redirecting the flow of the fluid from the notches toward the outlet to the tank port for improved stabilized flow thereof in the operation of the valve.

More specifically, the invention comprehends the provision in a fluid flow control valve having a block defining a spool valve chamber and ports communicating with the chamber, or an improved spool valve assembly including a spool body having an annular end provided with at least one axially outwardly opening notch, and a spool end on the spool body defining a first, frustoconical, axially outwardly narrowing radially outer surface concentrically within said annular end of the spool body, and a second, frustoconical, axially outwardly widening radially outer surface extending axially outwardly from the axial outer end of the first frustoconical surface and axially outwardly of the spool end.

In the illustrated embodiment, the spool body comprises a tubular spool element having an axial bore defining opposite end portions.

In the illustrated embodiment, the spool end includes an inner portion fixedly secured to the spool in the bore end portion and an intermediate portion defining the frustoconical surfaces.

In the illustrated embodiment, the spool end includes an outer end portion outwardly of the intermediate portion.

The fluid flow control valve of the present invention is advantageously adapted for use as a proportional flow control valve, while also functioning advantageously, when desired, as an on-off control valve.

The fluid flow control valve of the present invention comprises a balanced spool requiring only three transfer chambers in contradistinction to the prior art valves requiring five chambers to provide a balanced condition.

The fluid flow control valve of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
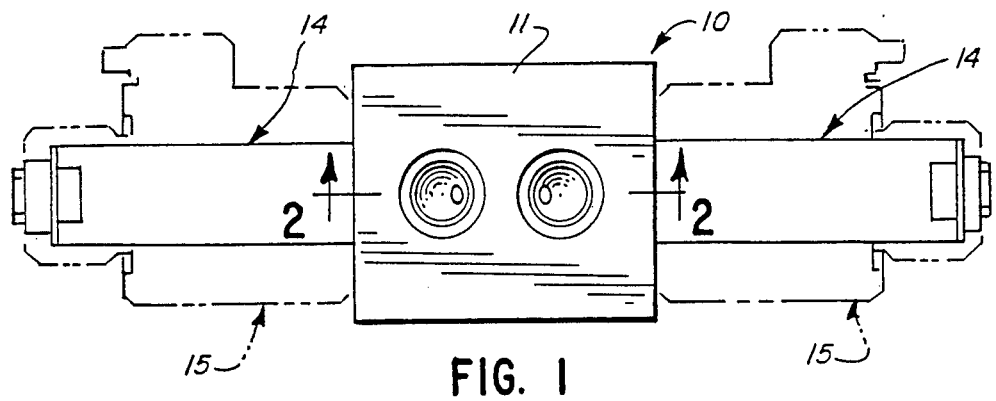
FIG. 1 is an elevation of a three-position, double solenoid directional proportional control valve embodying the invention, with associated solenoid operators shown in broken lines.

In the exemplary embodiment of the invention as disclosed in the drawing, a fluid flow control valve generally designated 10 includes a valve block 11 defining a spool valve chamber generally designated 12, and a spool valve assembly generally designated 13, selectively positionable in said chamber.

In the illustrated embodiment, the valve 10 comprises a three-position, double solenoid directional proportional control valve having, at opposite ends of the block 11, a pair of tube assemblies generally designated 14 and removable solenoid operators generally designated 15.

Figure 2:
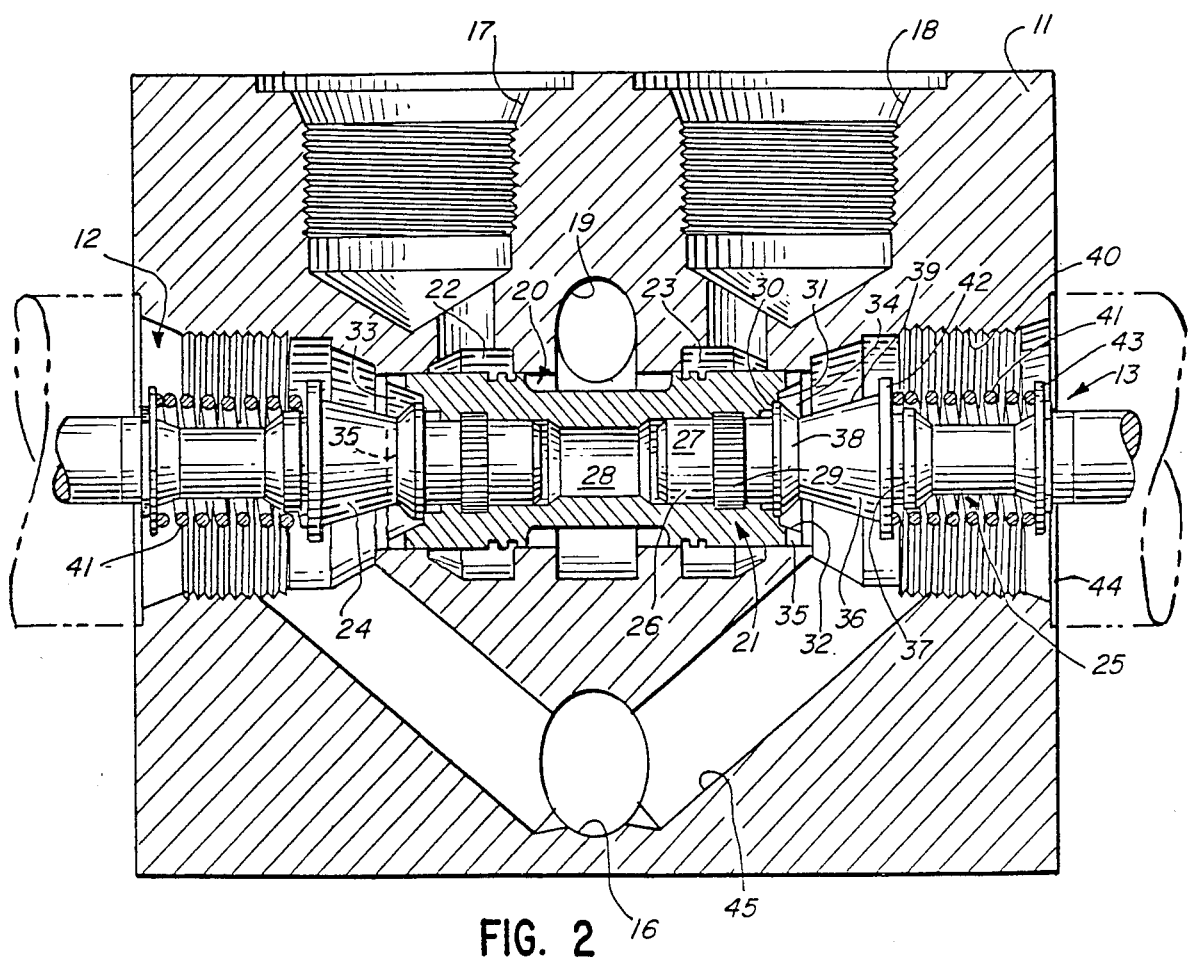
FIG. 2 is a fragmentary enlarged section taken substantially along the line 2—2 of FIG. 1.

As shown in greater detail in FIG. 2, the present invention is concerned with the provision of an improved spool valve assembly 13 providing for stabilized, smooth flow of return fluid through the valve to a tank port 16 provided in the block 11.

More specifically, as illustrated in FIG. 2, the block is provided with a pair of cylinder ports 17 and 18 respectively. A pressure port 19 is provided in the block for delivering pressurized fluid to a first annular chamber 20 provided in a tubular spool body 21 of the spool valve assembly 13.

Block 11 is provided with a pair of annular, radially inwardly opening chambers 22 and 23 communicating with the cylinder ports 17 and 18, respectively, at longitudinally opposite sides of the pressure port 19. In the center disposition of the spool assembly as shown in FIG. 2, the pressure port is blocked from communication with either of chambers 22 or 23 and no flow of fluid through the valve is effected.

Spool valve assembly 13 further includes a pair of spool ends 24 and 25 secured to the spool body 21 at opposite ends thereof.

More specifically, as shown in FIG. 2, each spool end includes an inner end portion 26 pressed into an end portion of a through bore 28 extending coaxially through the spool body 21. As shown, the inner end portion 26 may be provided with a knurled portion 29 fitted into the spool body to lock the spool end thereto in the installed arrangement illustrated in FIG. 2. A shoulder 30 is provided at the outer end of the inner end portion for limiting the inward movement of the spool end inner end portion 26 by the abutment of shoulder 30 with an outwardly facing shoulder 31 at the inner end of an outwardly widening frustoconical end portion 32 of the bore 28.

Spool body 21 defines annular, opposite end portions and 34, respectively, radially inwardly defining the frustoconical surfaces 32. As shown in FIG. 2, the annular end portion of the body is provided with a plurality of equiangularly spaced, axially outwardly widening triangular notches 35. In the illustrated embodiment, each notch comprises an isosceles triangular notch, the included angle of each notch being 90°.

As further shown in FIG. 2, each spool end further defines an intermediate portion 36 and an outer end portion 37.

The intermediate portion of the spool end defines an axially inner, axially outwardly narrowing frustoconical surface 38, and an axially outer, axially outwardly widening frustoconical surface 39. As shown, inner frustoconical surface 38 extends from shoulder 30 radially inwardly of the notches 35. Frustoconical surface 39 has a substantially greater axial length than that of surface 38, and in the centered arrangement of the valve as shown in FIG. 2, is disposed axially outwardly of the end of the spool body.

Intermediate portion 36 and outer end portion 37 are disposed within an outer end portion 40 of the valve chamber 12 in block 11. The spool assembly is balanced to the centered disposition by a pair of coil springs 41 compressed between a radial flange 42 on the spool end between intermediate portion 36 and outer end portion 37, and a retainer plate 43 retained in the valve chamber end by a closure plate 44.

As further shown in FIG. 2, tank port 16 is connected to the chamber end 40 by an angled passage 45. As shown, the passage opens toward frustoconical surface 39 on spool end portion 36.

In operation, fluid is delivered from pressure port 19 to either of the cylinder ports 17 or 18, depending on the selective axial displacement of the spool valve assembly. Thus, for example, if the solenoid operator means is operated to shift the spool valve assembly to the left so as to bring chamber 20 into communication with chamber 22, pressurized fluid is resultingly delivered from the pressure port 19 to the cylinder port 17.

At the same time, the displacement of the spool valve assembly to the left effects movement of the notches 35 at the righthand end of the spool to radially inwardly of the block chamber 23, permitting return flow of fluid from cylinder port 18 through the notches into valve chamber end 40. The flow of the return fluid is directed against frustoconical surface 39 by the guiding action of frustoconical surface 38, which surfaces cooperate in redirecting the fluid to enter into the transfer passage 45 in a smooth manner.

As will be obvious to those skilled in the art, the valve functions reversely identically where the spool valve assembly is moved to the right to provide pressurized fluid delivery to the cylinder port 18 and return delivery from the cylinder port 17 to the drain port 16.

The invention provides an improved, stabilized fluid flow return by means of the axially outwardly widening notches and the cooperating angled surfaces on the spool valve assembly intermediate portion. The structure is extremely simple and economical, while yet providing the substantially improved performance as discussed above.

The foregoing disclosure of specific embodiments is illustrative of the broad inventive concepts comprehended by the invention.

I claim:

1. In a fluid flow control valve having a block defining a spool valve chamber, and ports communicating with said chamber, an improved spool valve assembly comprising:
   a tubular spool having an axial bore defining an end portion, and an annular end provided with at least one axially outwardly opening notch;
   a spool end having an inner end portion fixedly secured to said spool in said bore end portion, an intermediate portion defining a first, frustoconical axially outwardly narrowing radially outer surface concentrically within said annular end of the spool, and a second, frustoconical, axially outwardly widening radially outer surface extending axially outwardly from the axially outer end of said first frustoconical surface and axially outwardly of said spool annular end, said outer surface facing substantially directly toward one of said block ports; and
   means for selectively positioning the spool in said chamber.

2. The valve structure of claim 1 wherein said inner end portion of the spool is knurled.

3. The valve structure of claim 1 wherein said spool annular end is provided with a pair of said notches diametrically opposed to each other.

4. The valve structure of claim 1 wherein the axial length of said second frustoconical surface is substantially greater than the axial length of said first frustoconical surface.

5. In a fluid flow control valve having a block defining a spool valve chamber, and a pair of ports communicating with said chamber, an improved spool member assembly comprising
   a spool body having an annular end provided with at least one axially outwardly opening notch, and a spool end on said spool body defining a first, frustoconical axially outwardly narrowing radially outer surface concentrically within said annular end of the spool body and said notch therein, and a second, frustoconical, axially outwardly widening radially outer surface extending axially outwardly from the axial outer end of said first frustoconical surface and axially outwardly of said spool end.

6. The valve structure of claim 5 wherein said spool annular end is provided with a plurality of said notches equiangularly spaced about the axis of said end.

7. The valve structure of claim 5 wherein one of said ports is disposed to be in communication with said notch as a result of inward movement of the spool valve assembly, said outwardly widening configuration of said notch causing the area of communication to increase directly as a function of said inward movement.

8. The valve structure of claim 5 wherein a second such annular spool body and a second such spool end are provided at the opposite end of the spool valve assembly.

9. The valve structure of claim 5 wherein one of said ports is disposed to be in communication with said notch as a result of inward movement of the spool valve assembly, said outwardly widening configuration of said notch causing the area of communication to increase directly as a function of said inward movement, a second such annular spool body and a second such spool end are provided at the opposite end of the spool valve assembly, and a second of said ports in said block is disposed to be communication with the notch of said second annular spool body end as a result of opposite movement of said spool valve assembly.

10. The valve structure of claim 9 wherein said spool assembly defines an axial center and is symmetrical about said axial center.

11. The valve structure of claim 5 wherein a second such annular spool body end and a second such spool end are provided at the opposite end of the spool valve assembly, and solenoid means are connected one each to said spool ends for selectively positioning said spool valve assembly in said chamber.

12. The valve structure of claim 5 wherein one of said ports is disposed to be in communication with said notch as a result of inward movement of the spool valve assembly, said outwardly widening configuration of said notch causing the area of communication to increase directly as a function of said inward movement, a second such annular spool body and a second such spool end are provided at the opposite end of the spool valve assembly, and a second of said ports in said block is disposed to be in communication with the notch of said second annular spool body end as a result of opposite movement of said spool valve assembly, the outer surfaces of said spool ends facing respectively substantially toward a corresponding pair of block ports.

13. A spool member for use in a spool valve, said spool valve member comprising a body defining an axis and an axially outer end, said body having a through bore defining an axially outer end in said body outer end, said body outer end defining at least one axially outwardly opening notch, said notch further opening radially inwardly to said bore outer end, and an extension on said body having an axially inner portion defining a first frustoconical axially outwardly narrowing radially outer surface concentrically within said body outer end and said notch therein, and a coaxial second, frustoconical, axially outwardly widening radially outer surface extending axially outwardly of the axially outer end of said first frustoconical surface and axially outwardly of said body outer end.

14. The spool member of claim 13 wherein said notches widen axially outwardly.

15. The spool member of claim 13 wherein said notches comprise triangular notches widening axially outwardly.

16. The spool member of claim 13 wherein said notches comprise isosceles triangular notches widening axially outwardly.

* * * * *